(12) United States Patent
Benham et al.

(10) Patent No.: US 6,324,323 B1
(45) Date of Patent: Nov. 27, 2001

(54) ADHESIVE-FREE LENS-ATTACHED OPTICAL FIBERS TO OPTICAL WAVEGUIDE PACKAGING SYSTEM

(75) Inventors: Victor Benham, Aylmer; Hamid Hatami-Hanza, Ottawa, both of (CA)

(73) Assignee: Nu-Wave Photonics Inc., Ottawa (CA)

( * ) Notice: Subject to any disclaimer, the term of this patent is extended or adjusted under 35 U.S.C. 154(b) by 0 days.

(21) Appl. No.: 09/471,206

(22) Filed: Dec. 23, 1999

(30) Foreign Application Priority Data

Jan. 7, 1999 (CA) .................................... 2258398

(51) Int. Cl.[7] .................................................. G02B 6/30
(52) U.S. Cl. ............................... 385/49; 385/50; 385/51; 385/52; 385/14
(58) Field of Search ................................. 385/53, 55, 59, 385/62, 65, 70, 71, 81, 83, 49, 97, 98, 50, 14

(56) References Cited

U.S. PATENT DOCUMENTS

| | | | |
|---|---|---|---|
| 4,046,454 | * | 9/1977 | Pugh, III .............................. 385/65 X |
| 4,796,975 | * | 1/1989 | Lukas et al. ......................... 385/49 X |
| 5,015,059 | * | 5/1991 | Booth et al. ......................... 385/49 X |
| 5,134,676 | * | 7/1992 | Boillot et al. ............................ 385/72 |
| 5,175,781 | * | 12/1992 | Hockaday et al. ...................... 385/49 |
| 5,297,228 | * | 3/1994 | Yanagawa et al. .................... 385/129 |
| 5,361,382 | * | 11/1994 | Nakamura et al. ....................... 385/49 |
| 5,393,371 | * | 2/1995 | Chang et al. .......................... 156/629 |
| 5,574,811 | * | 11/1996 | Bricheno et al. ........................ 385/51 |
| 5,600,745 | * | 2/1997 | Wuu et al. ............................... 385/49 |
| 5,644,672 | * | 7/1997 | Tanaka .................................. 385/137 |
| 5,737,138 | * | 4/1998 | Someno .............................. 385/49 X |
| 5,835,659 | * | 11/1998 | Ota et al. .............................. 385/137 |
| 5,889,914 | * | 3/1999 | Gentsu ................................. 385/137 |

FOREIGN PATENT DOCUMENTS

| | | | |
|---|---|---|---|
| 3443693-A1 | * | 6/1986 | (DE) .................................. 385/65 X |
| 2151043-A | * | 7/1985 | (GB) .................................. 385/62 X |

* cited by examiner

*Primary Examiner*—Brian Healy
(74) *Attorney, Agent, or Firm*—Friedrich Kueffner

(57) ABSTRACT

A method of forming a package of an optical waveguide and optical fibers. The optical fibers are positioned between two compressive material layers and, with the fibers located in alignment grooves with one of the compressive layers between fibers and the groove surface, compression is applied. For compression, two rigid substrates, disposed one disposed one on each side of the arrangement of fibers and compressive layers, are urged towards each other. As the compressive layers are being compressed, the fibers are urged laterally into the grooves and into optical alignment with the waveguide. Preferably, two rigid plates, one on each side of the above assembly, are urged towards each other for compression. The plates are urged together at a plurality of localized positions so that the force applied may be adjusted individually at each of these locations so as to more precisely align the fibers and waveguide. The invention also includes a package made by the method.

14 Claims, 8 Drawing Sheets

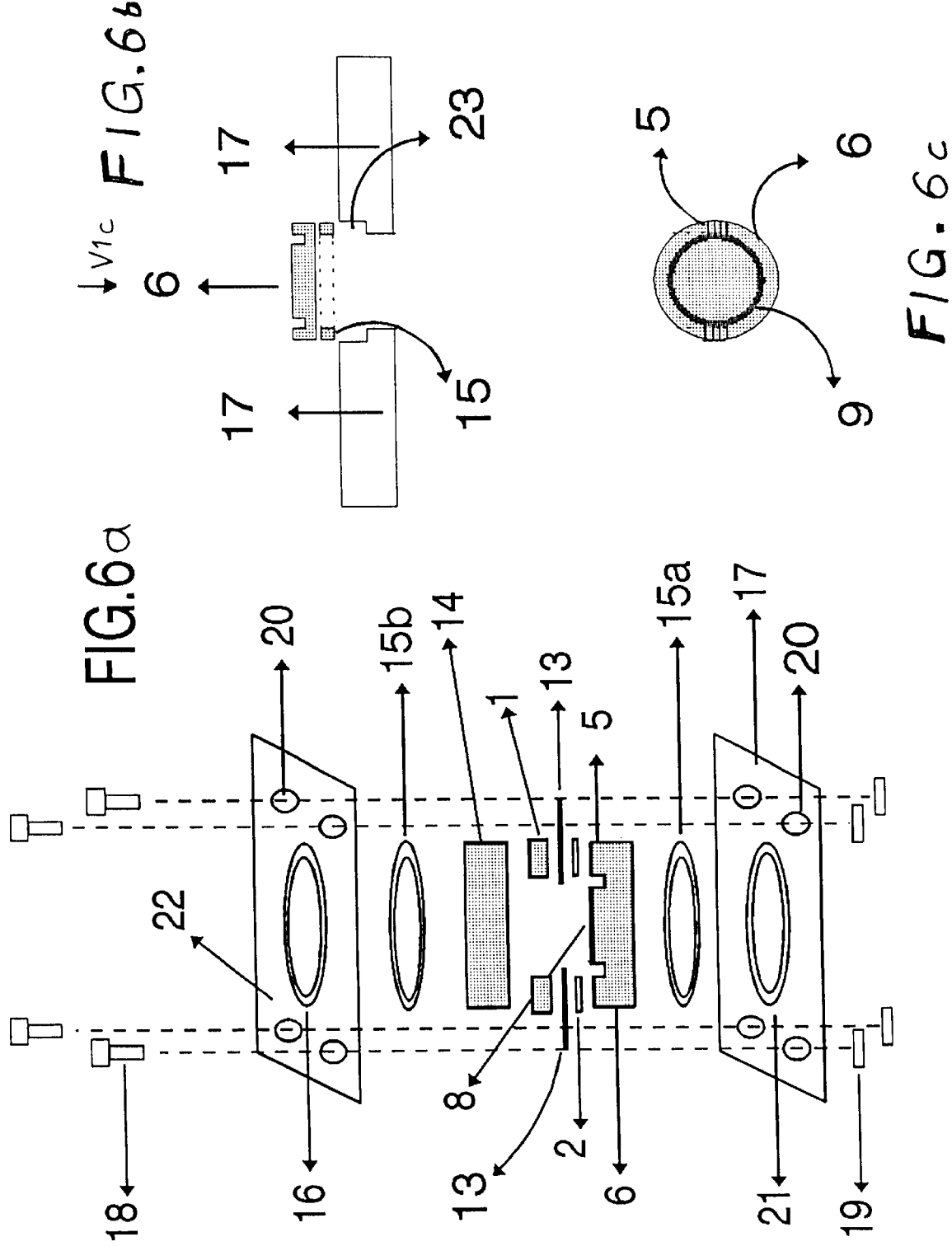

~2.2 mm 25 mm

24

ADHESIVE-FREE LENS-ATTACHED OPTICAL FIBERS TO OPTICAL WAVEGUIDE PACKAGING SYSTEM

FIELD OF THE INVENTION

The present invention generally relates to the packaging of integrated optical waveguide circuits, and more particularly to the alignment of optical fibers to input and output ports of the waveguide circuit and for maximizing the optical energy transferred between the optical fibers and input/output ports of the waveguide circuits.

BACKGROUND

Integrated optical waveguide circuits (IOWCs) are photonics counterparts of electronic integrated circuits (ICs). They are used to perform different operations for processing optical signals in optical or opto-electronics domain. They have a broad range of applications such as in optical telecommunication networks, sensors, and biomedical apparatuses.

An IOWC has a number of input and output waveguides that have to be attached to optical fibers before it can be used by the consumers. However, the attachment of fibers to waveguides with the objective of maximizing optical power coupling between the fiber and waveguide imposes several technological challenges. That is because firstly the core diameter of fibers and waveguides are typically small, e.g. 2 to 20 microns, and secondly they are not often equal. The former makes the fiber to waveguide alignment extremely critical and the latter causes the loss of some optical power due to mismatch between the mode sizes of the fiber and waveguide. Any small misalignment between the fiber and waveguide core axis can increase the coupling loss of optical power significantly, whereas the mismatch between the core size of the fiber and waveguide will result in loss of optical power even at the perfect alignment position. However waveguides with small core diameter and higher numerical aperture than single mode fibers are more desirable in order to decrease the total length of an IOWCs. Therefore one should often compromise between the inherent joint loss of waveguides of different core sizes and the total length of the IOWCs.

There are two conventional methods of attaching fiber to waveguides, one is by manual or active alignment, and the other by automatic alignment. A combination of automatic and manual alignment is also possible. In the manual method, each individual optical fiber is abutted to the input or output waveguides by careful adjustment of the fiber position in front of the waveguide while monitoring the efficiency of the light coupling and affixing the fiber using adhesive and the like at the optimum position. Although manual alignment results in a better coupling loss, it is very time consuming thus making the packing of IOWCs very expensive. Also because of the use of adhesives used in affixing the fiber to the waveguide, the manual method does not provide very reliable results.

As for the automatic alignment method, it is known to use a substrate having alignment grooves to align the fiber core and waveguide and also to support the fiber. Alignment grooves for this purpose are also known in integrated optical circuits. While grooves provide lateral and angular alignment they cannot provide precise vertical alignment since, within a micron, precision control of the depth of the grooves is very difficult. Automatic alignment methods have been disclosed, for instance, in U.S. Pat. Nos. 4,796,975, 5,393,371, 5,175,781, 5,297,228, 5,361,382, and 5,600,745.

In U.S. Pat. No. 5,175,781 issued on Dec. 29, 1992 to Hockaday et al, there is disclosed a method of attaching fiber to integrated optic chips (IOC) by forming alignment grooves, using laser ablation on the IOC followed by cutting the surface ends of the waveguides by dicing saw, disposing optical fibers within the grooves, and securing the fibers with adhesives to attach the fiber to the IOC permanently. This method again cannot insure vertical alignment and doesn't solve the core size mismatch problem.

In U.S. Pat. No. 5,361,382 to Nakamatira et al, another method of connecting optical waveguide and optical fiber has been disclosed. In that disclosure waveguides are made on one substrate. An optical connector is formed on a second substrate. The substrates have means for aligning them together and the second substrate has alignment grooves with fibers embedded therein. Adhesive and the like are used to fix the optical connector substrate and waveguide substrate after aligning the substrates. In a subsequent U.S. Pat. No. 5,297,228 from the same applicants, fiber aligning jigs are aligned with the optical waveguides using markers and are abutted to each other by laying a common guide pin along the corresponding prefabricated pin grooves on the fiber aligning jig and waveguide substrate. This method also suffers from the low reliability of using adhesive and also the loss associated with the fiber and waveguide core mismatch.

In U.S. Pat. No. 5,600,745, issued on February 1997 to Hsinchu et al, there is disclosed a preferred method of chemically etching of V-grooves and V-grooves with a predetermined lateral angle to precisely adjust the fibers to the waveguide in the vertical direction. This method however uses adhesives to abut the fibers to the waveguide and it doesn't address the core size mismatching problem.

SUMMARY OF THE INVENTION

The present invention seeks to provide a method of providing a package of an optical waveguide and optical fibers which seeks to overcome the above problems.

Accordingly, the present invention provides a method of forming such a package upon a first rigid substrate and in which optical fibers are disposed within alignment grooves in a surface of the substrate with a compressible layer disposed between each fiber and its corresponding alignment groove surface. In this method, a second compressible layer is disposed over the optical fibers and the layers and the fibers are sandwiched between the substrate and a further substrate. The substrates are pressed towards each other thereby compressing the layers and forcing each of the optical fibers further into its alignment groove and into optical alignment with the optical waveguide. With this method and using the compressible layers, alignment of the fibers can be successfully achieved without the use of adhesive while the assembly is held together with its parts being relatively immoveable.

Ideally, the first and second rigid substrates are disposed between rigid plates, the rigid plates being forced towards each other into desired relative positions for he purpose of pressing the substrates towards each other for the above purpose.

In a preferred method, the rigid plates are forced towards each other at a plurality of localized positions of the plates so as to adjust the force applied between and the distance between the rigid plates at each of the localized positions.

The invention also includes a package of an optical waveguide and optical fibers with first and second substrates sandwiching between them an arrangement of a plurality of the fibers disposed between compressive material layers.

Each of the fibers is contained within a groove formed within one of the rigid substrates and one of the compressible layers is disposed between each fiber and its corresponding groove.

In the above method and package of the invention, the alignment grooves may be made using lithography and an associated etching method, such as dry etching, chemical etching, whichever is suitable for the waveguide and substrate materials, or by laser ablation; forming other grooves may be done utilizing a dicing saw or any other suitable cutting means to cut the grooves. The depth of these grooves exceeds the depths of the alignment grooves and has a width of few hundred microns. The method also includes forming a lens at the tip of the fiber by dipping into a transparent flowable material, i.e. adhesive such as sol-gel liquid glass; and hardening it to form a plano-convex lens at the end of the fiber.

BRIEF DESCRIPTION OF THE DRAWINGS

One embodiment of the invention will now be described, by way of example, with reference to the accompanying drawings in which:

FIG. 6a is a diagrammatic exploded isometric view of the complete package;

FIG. 6b is a side elevation cross-sectional exploded view of part of the package;

FIG. 6c is a plan view on the part of the package in the direction of arrow VIc in FIG. 6b;

DESCRIPTION OF THE PREFERRED EMBODIMENT

Figure 2:
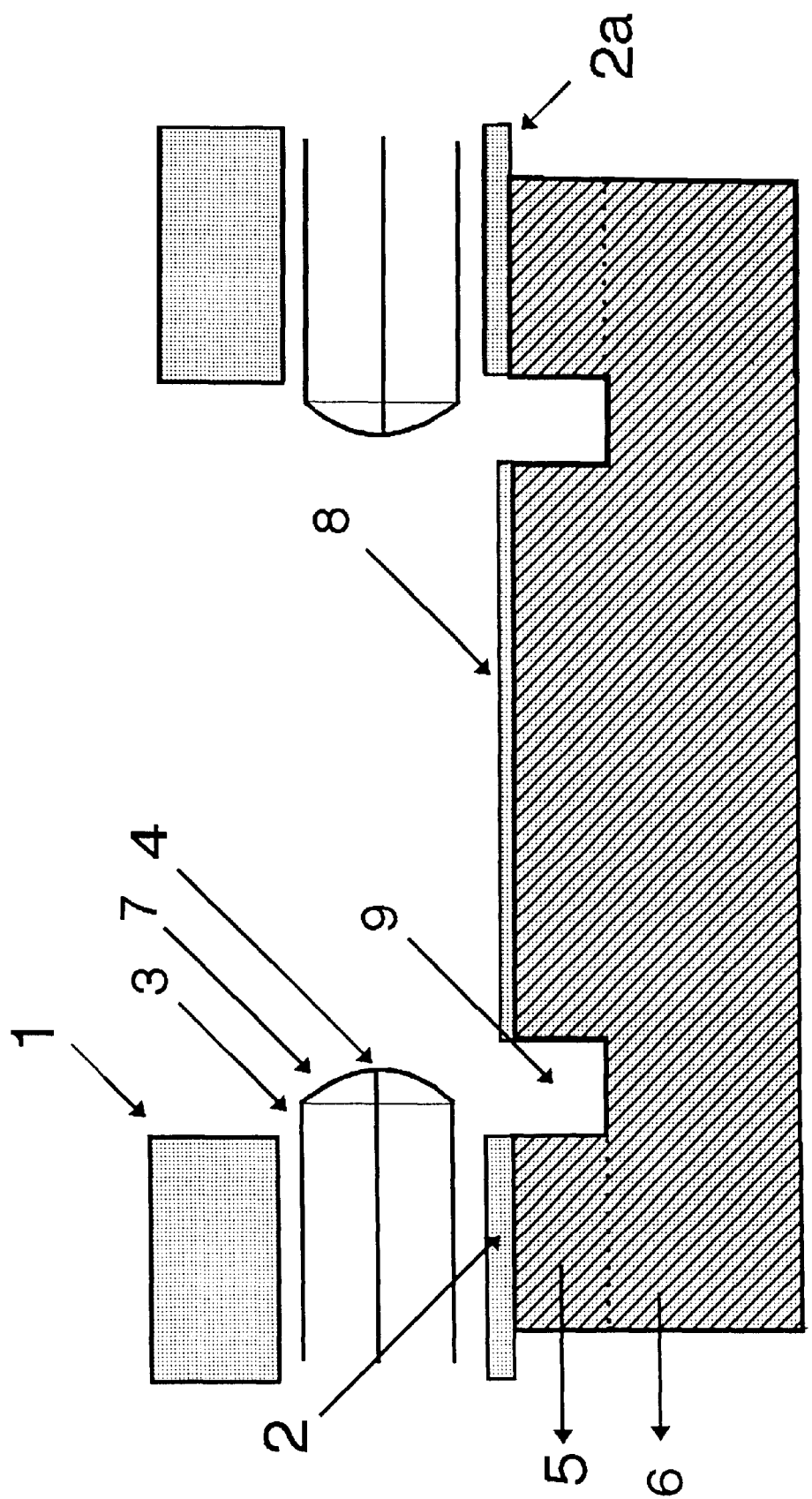
FIG. 2 is a cross-sectional view taken along line 11—11 in FIG. 1 of part of the package.
Figure 3:
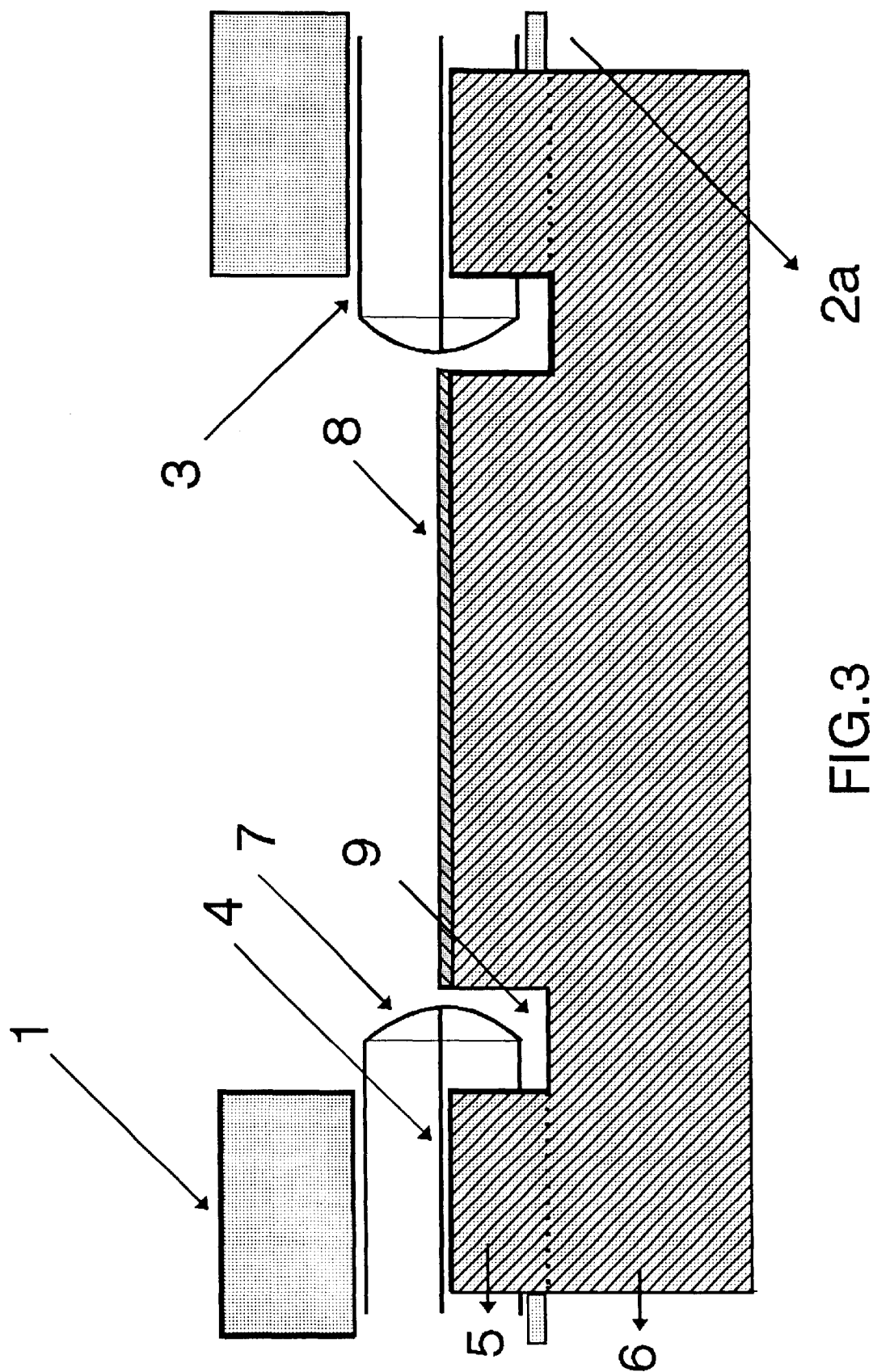
FIG. 3 is a view similar to FIG. 2 of the part of the package at a later stage of manufacture.
Figure 4:
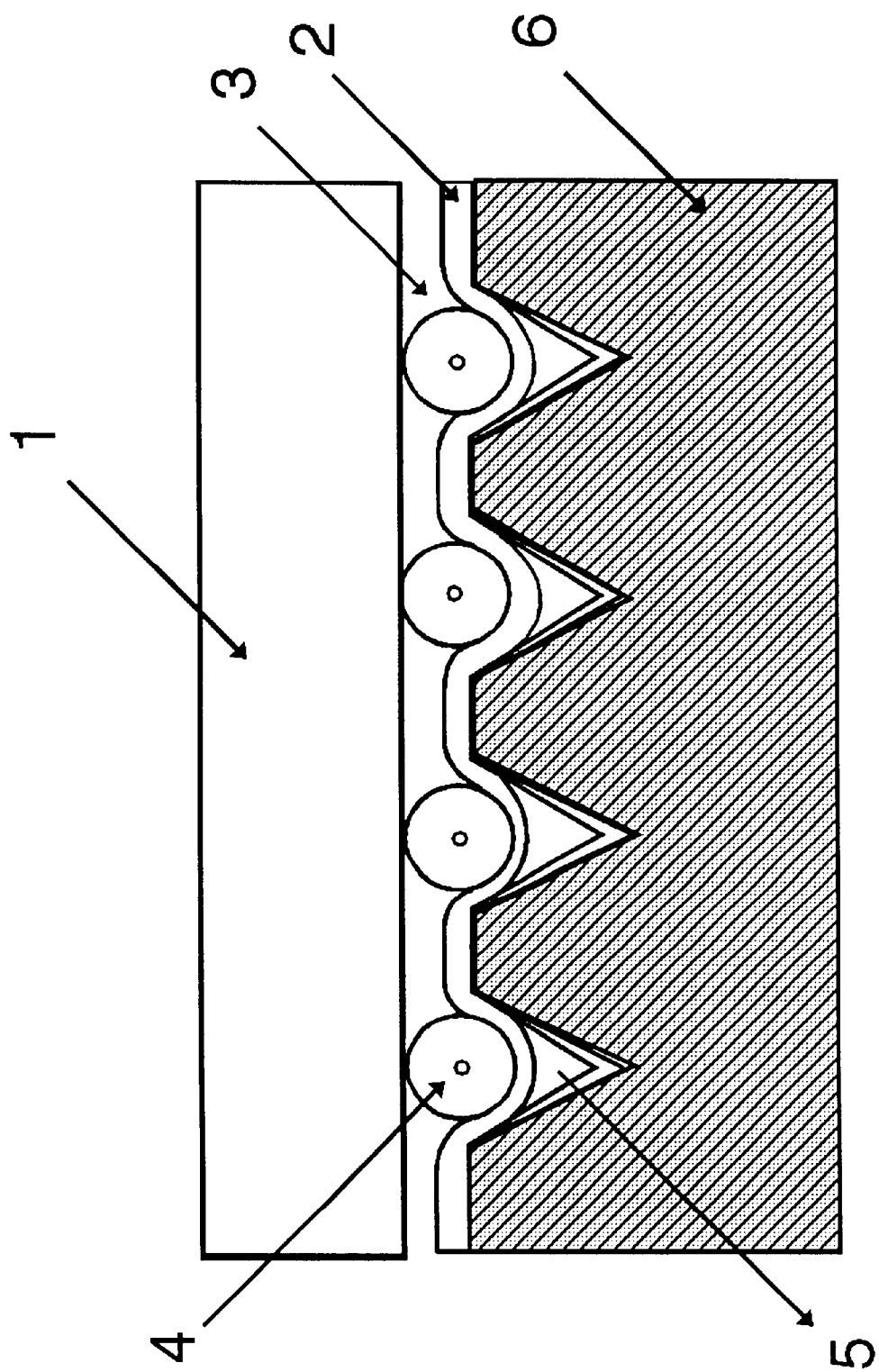
FIG. 4 is a view similar to FIG. 1 and showing the stage of manufacture of FIG. 3.
Figure 8:
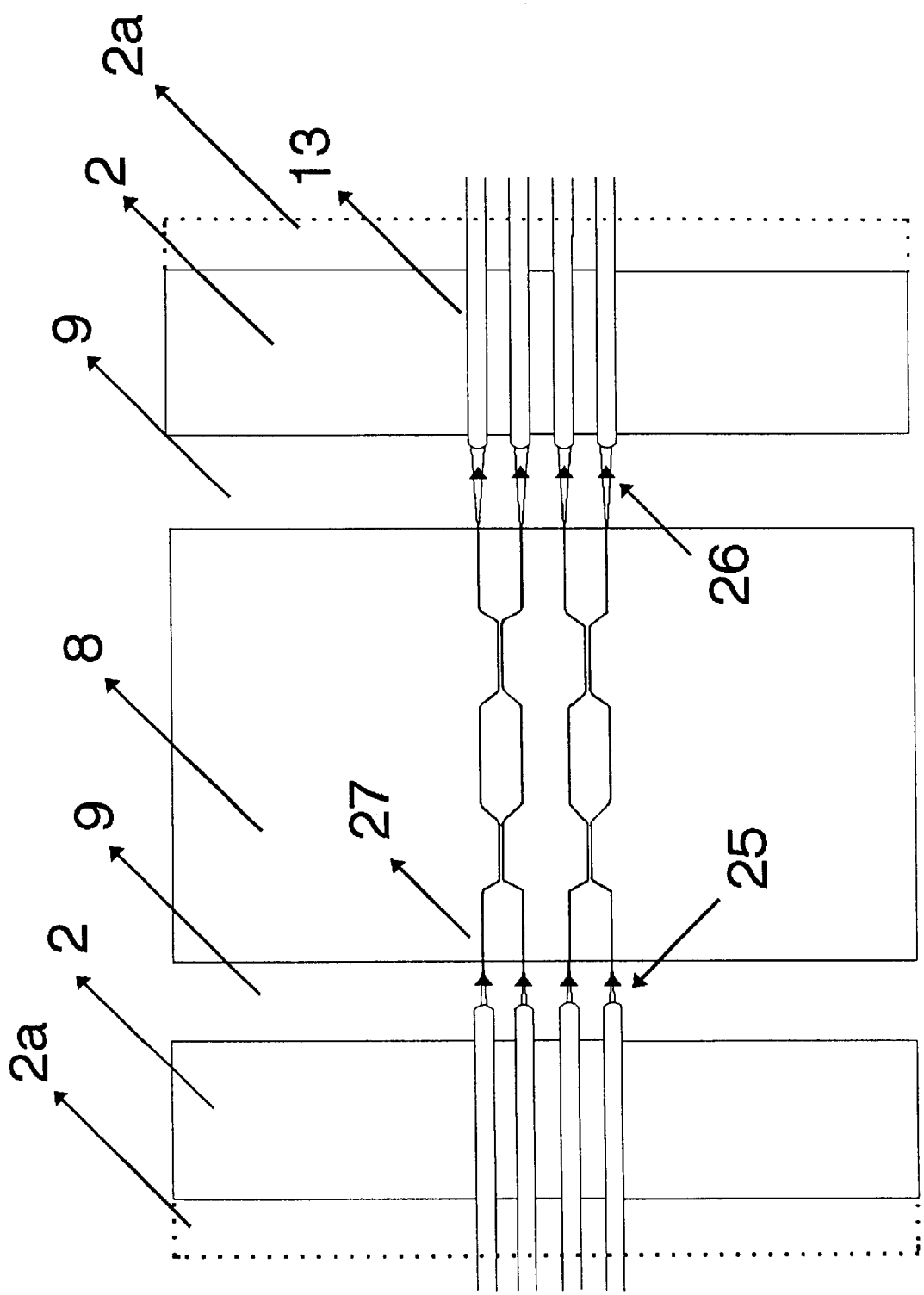
FIG. 8 is a plan view of part of the package showing waveguide and optical fiber positions upon a substrate.

As shown by FIGS. 1 to 4 and 6, a package of an optical waveguide and optical fibers comprises a planar waveguide 8 positioned upon a planar surface of a rigid substrate 6. At two opposite ends of the waveguide, the substrate 6 is formed with two parallel grooves 9 (see particularly FIG. 8). Parallel V-shaped fiber alignment grooves 5 (FIGS. 2 and 4) are provided in the same surface of the substrate 6 as the grooves 9. The grooves 5 are parallel and extend normal to each of the grooves 9 to an adjacent edge of the substrate 6. Optical fibers 3 are disposed within the grooves 5 and extend so as to have end regions of the fibers which lie adjacent to the waveguide 8, positioned partly over the grooves 9 (FIG. 3) as will be described. The fibers 3 are spaced from surfaces of the grooves 5 by a flexible compressive material layer 2 (FIG. 4).

A further flexible compressive material layer 1 is located upon the other sides of the fibers 3 from the compressive layer 2, the layer 1 being surmounted by another rigid substrate 14. The layer 1 is thicker and less compressible than the layer 2.

The layers 6 and 14 are held pressed towards each other to compress the arrangement of compressive layers 1 and 2 and fibers 3, by two rigid plates 16 and 17. The plates 16 and 17 are hard metal plates, such as stainless steel. The substrates 6 and 14 are disposed within recesses 23 (FIG. 6b) of the plates 16 and 17, respectively, for alignment purposes and resilient O rings 15a and 15b are disposed at the bases of the recesses 23 to support the substrates.

At localized positions, the plates 16 and 17 are secured together. There are four such positions at which bolts 18 extend through aligned apertures 20 in the two plates to receive securing nuts 19.

Figure 1:
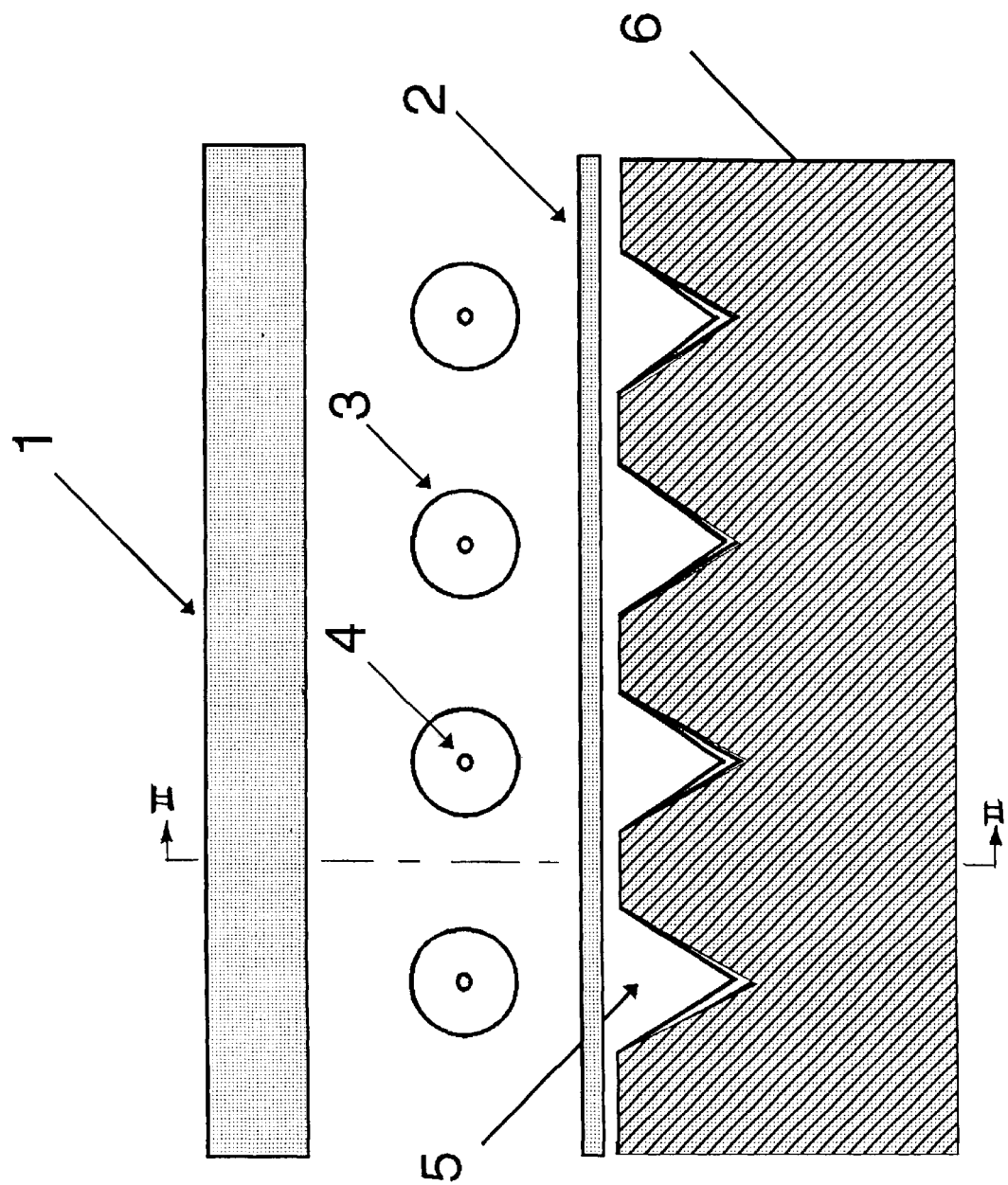
FIG. 1 is a cross-sectional view in side elevation of part of a package, according to the embodiment, shown at one stage during its manufacture.

To assemble the package, the lawyers 2 are located upon the substrate 6 to bridge the grooves 5 (FIG. 1). Fibers 3 are placed upon the layers 2 in alignment with the grooves 5. Edges 2a of the layers 2 extend over the edge of substrate 6 to prevent direct and damaging contact between the fibers and the substrate 6.

The next step of packaging the assembly involves the positioning of the fibers 3 in an "x" direction with respect to the optical waveguide 8, i.e. in the plane of the package shown in FIGS. 2 and 3. This positioning is to ensure that the point of impact of a converging beam of light with the waveguide surface is slightly less than the focal distance of a lens upon each of the fibers 3 thereby avoiding thermal decomposition of the waveguide substance. The preparation of the lens at the end of each fiber is detailed below and the curvatures and focal points of the lens-attached optical fibers are pre-calculated to enable alignment in the "y" direction, i.e. in the plane of FIGS. 1 and 4. The curvature and focal points of the lens-attached fibers should be either identical or substantially so. It is important to note that the thickness of the layer 2 is chosen such that after laying the layer and fibers inside the alignment grooves 5, the cores of the embedded fibers lie above the surface of the optical waveguide ("z" direction) by an amount corresponding to the compressibility of the layer (i.e. 10 to 40%).

The layers 1 are placed into position over the fibers as shown in FIGS. 1 and 2, each layer 1 having sufficient width to extend beyond the substrate 14 in a similar manner to the edges 2a of the layers 2 discussed above so as to protect the fibers.

The substrate 14 is then located over the layers 1. With the substrates 6 and 14 located into the recesses 23, the plates 16 and 17 in position on each side of the assembly including the substrate 6 and 14, are urged towards one another by use of the bolts 18 and nuts 19. Each substrate 6 and 14 projects out from its recess 23 so that as the plates 16 and 17 are screwed towards each other, the layers 1 and 2 are compressed between each substrate 6 and 14 and the optical fibers 3. As the plates 16 and 17 move towards each other, the fibers are forced down into the grooves, the object being to relatively position the plates with the waveguide 8. This is the position shown by FIG. 3. In this respect, the bolts 18 and nuts 19 at their four localized positions may be used to adjust the force between the plates at each localized position so as to accommodate for different thicknesses of fibers when optically aligning the fibers with the waveguide. Also, the compressive layers 1 and 2 assist in optically aligning the fibers 3 with the waveguide. In the finished package, the end regions of the fibers 3 overlying the grooves 9 are surrounded by open space.

During tightening of the nuts 19 upon the bolts 18, the degree of alignment is monitored on-line by an optical source and photo detector. For precise alignment, it is recommended that for each increment of compression, sufficient time (i.e. up to 30 minutes) is permitted, prior to the measurement of an output optical signal received on one of the optical fibers 3 which happens to be an outgoing fiber, as distinct from an incoming fiber on the opposite side of the waveguide 8.

It should be mentioned that this method of alignment and packaging utilizes no adhesive although if required some adhesive may be used. The completed package may be disassembled and reassembled as required thus rendering it inexpensive in manufacture and use. The whole assembly may be miniaturized so that a more manageable packaging is achieved.

Figures 7A, 7B:
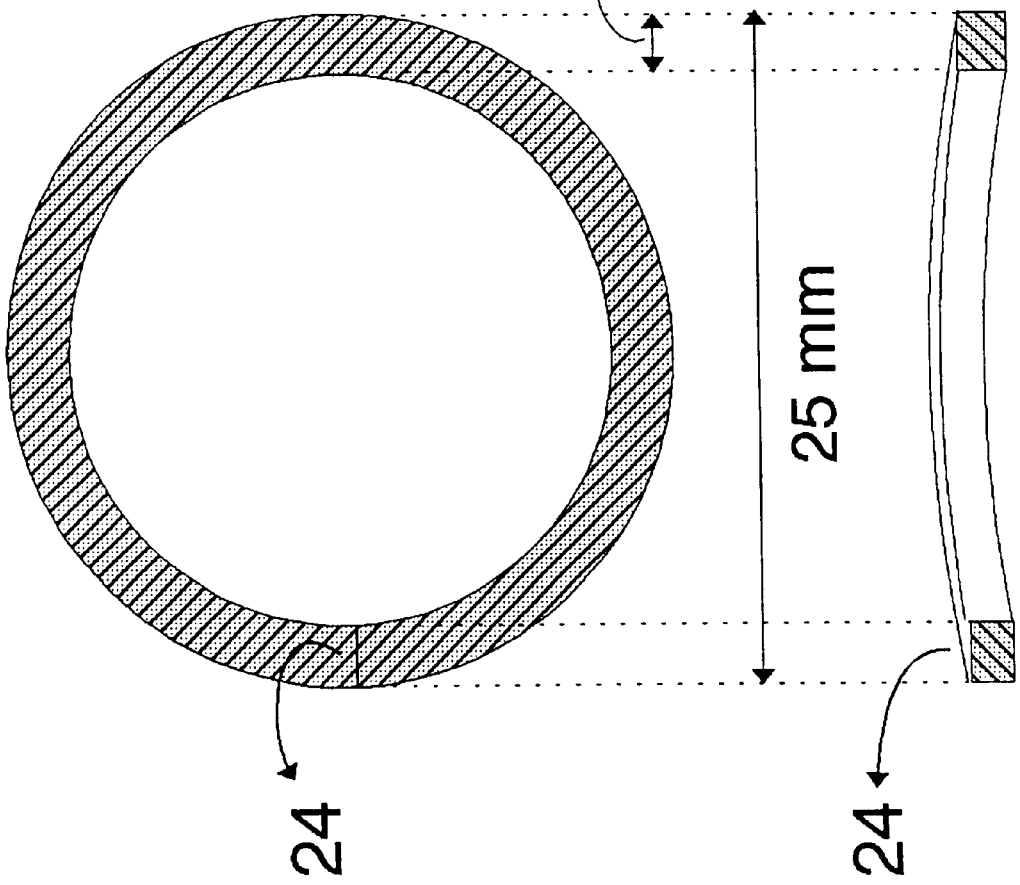
FIGS. 7a and 7b are, respectively, plan and isometric cross-sectional views of a gasket of the package.

In the above structure, the gaskets 15a and 15b may have the shape shown in FIGS. 7a and 7b, and are as flat as possible.

FIG. 6c shows a modification of a substrate 6 of circular shape with single circular groove 9 surrounding a waveguide (not shown) with grooves 5 extending to the groove 9.

Other details concerning the embodiments are as follows. One of the substrates (6) is preferably made of a phosphorus-doped silicon dioxide glass. The presence of phosphorus facilitates the cutting process of the substrate. Prior to etching the grooves 5 and 9, the two said substrates 6 and 14 are gently washed with the choice of appropriate solvents described, for instance, in, "introduction to Microelectronics Fabrication, Molecular Series on Solid State Devices, Richard C. Jaeger, editors; Gerold W. Neubeck, and Robert F. Pierret, Addison-Wesley Publishing Company, Vol. 5, 1993, the disclosure of which are incorporated herein as a reference. If the substrates are circular as in FIG. 6c, each substrate has the desired diameter and typically from 20 to 50 millimetres and thickness of about 1 millimetre. For simplicity reasons, the two substrates will be referred to as the upper and lower substrate. The upper substrate (14) which is made of silicon or silicon oxide glass or any other suitable material, is use "as is" with no other treatment.

The waveguides and grooves may be fabricated by different methods. In a first method, the waveguide circuit is fabricated on the substrate 6 and then the grooves 5 are formed by an appropriate etching method such as chemical etching, laser ablation etching and the grooves 9 are fabricated by using a dicing saw. The waveguide maybe fabricated on silicon or silica substrates or other desirable materials such as $LiNbO^3$. Waveguide fabrication technology may include ion exchange, flame hydrolysis and titanium diffusion on $LiNbO^3$ an so on. Referring or FIG. 1, the shown grooves 5 are imprinted by lithography and chemically etched, if applicable, in a perfect alignment with the waveguides using markers or other visual means if laser ablation is used. Some materials such as BK 7 silica glass is hard to etch by plasma ion etching or chemical etching and therefore laser ablation maybe more applicable for fabricating the grooves 5 in these materials. Markers are used in both masks corresponding to the waveguide circuit layout and grooves layout to make sure the grooves and waveguide are perfectly aligned if they are fabricated in two separate process of waveguide fabrication and etching grooves. Although the alignment grooves 5 could be etched with laser ablation, chemical etching or plasma etching, it is the chemical etching which provides the best application for this method. Referring to FIG. 2, the gasket 2, placed between the fibers 3 and lower substrate 6, provides a better protection for such a method of etching. The grooves, 9, shown in FIG. 2 are cut utilizing dicing saw to a desired depth and width.

In the second method of fabrication, the waveguide is fabricated on thin films of sol-gel glasses deposited on a substrate of silicon or any other desirable material as described in articles such as: Fabrication and Characterization of Low-Loss, Sol-Gel Planar Waveguides," authored by Yang Lin, et al. appeared in Anal. Chem, pp. 1254–1263, Vo. 66, 1994, or "Ultraviolet light imprinted sol-gel silica glass channel waveguides on silicon," authored by Njafi et al, appeared in published in SPIE, 38–41, vol. 2695, 1996; the disclosures of which are incorporated herein as references. In one preferred method of fabrication of sol-gel glass waveguide on silicon or phosphorus-doped silicon oxide glass substrates, using silicon or phosphorus doped glasses as substrates enables an easier and faster etching process. To make the grooves 5 the location of grooves is determined with a number of markers on the substrate by an associated lithography method; the grooves are then etched away to the desired depth, e.g. 50–250 micron, by chemical etching; then thin layers of sol-gel glass are deposited on the substrate as lower cladding, e.g. with the thickness of 10 to 100 micron, and a photosensitive core layer; e.g. 4–10 micron thick; sol-gel solution are wiped off from the grooves and the deposited layers of sol-gel are dried and annealed in an appropriate temperature; waveguide circuit is then fabricated by masking the core layer with the desired pattern by lithography or by covering it with a mask having the desired waveguide circuit pattern; the waveguide is then fabricated by a method that has been described in the above mentioned references. By matching the markers of the mask with a layout of grooves and the mask with the layout of waveguide circuits one can make sure that fabricated waveguides and the pre etched grooves are in perfect lateral alignment. It is also preferred to coat an upper layer sol-gel as the upper cladding. Referring to FIG. 2 again, the grooves 9 are then cut utilizing a dicing saw with the width of about 300 to 1000 micron and to a depth of about 200 microns. Dicing saw can cut the end surfaces of the waveguide at a desirable angle. The cut surfaces by the dicing saw are polished up to or better than 5 microns flatness.

In the third method of fabrication, the waveguide is made separately from a substrate with different material from that of the grooved substrate. In this case the substrate with grooves also has a predetermined etched area that can accommodate the separately fabricated waveguide circuit in that area. The waveguide circuit device is positioned and affixed by the adhesive and the like in the predetermined etched area in such a way that the waveguides are aligned with the grooves laterally, by aligning the markers of waveguide circuit substrate with that of substrate with grooves, and the waveguides' core will be almost in vertical alignment with the cores of fibers after being placed in the grooves. There also will be a gap between the end faces of the waveguides and the beginning of the grooves that will serve as an auxiliary grooves in the first and the second exemplary embodiments. The advantage of fabricating the waveguide circuit separately is that the end faces of the optical waveguide can be optically polished with the desired angle therefore reducing the reflection of incoming optical signal.

Figure 5:
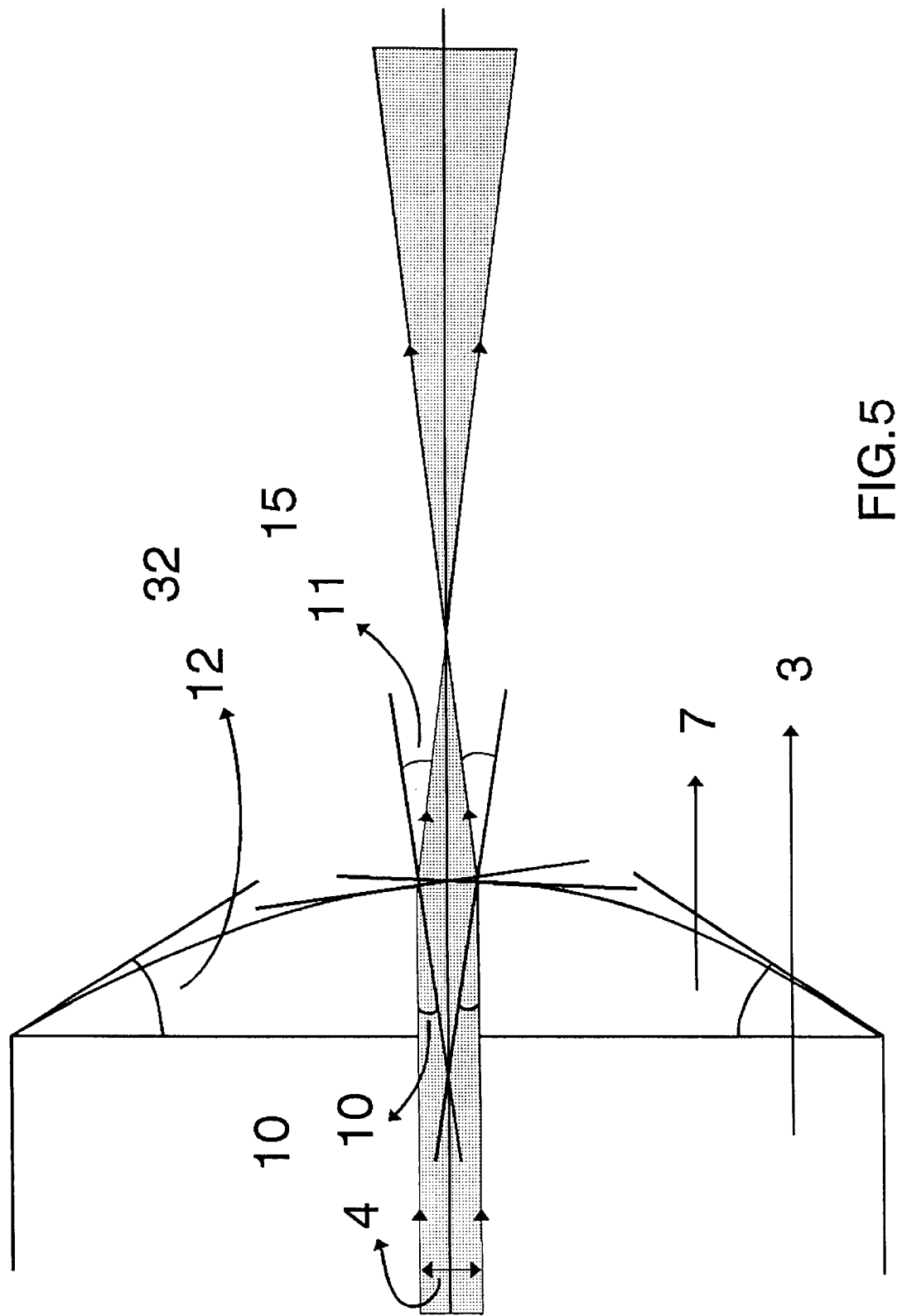
FIG. 5 is a diagrammatic side elevational view of an end region of a fiber of the package and showing light ray geometry.

Having fabricated the said waveguide circuit and grooves, another step preparatory to forming the assembly shown in FIG. 6 is to prepare the optical fibers (3). The ends of fibers are cat such that the cut surfaces are normal to the core central axis of the fibers. They are then carefully washed for instance with chloroform, acetone and water respectively and dried in the oven at a temperature of about 105 degrees of centigrade. The end regions of the fibers are carefully and gently dipped into a transparent flowable material, e.g. a transparent adhesive, such as a sol-gel solution with a refractive index close to that of fiber core. It should be mentioned that to form a droplet, a wide range of curable hybrid organic-inorganic sol-gel solutions may be used, wherein the cured end-product exhibits a refractive index equal to that of a silica glass or thereabouts. FIG. 5 indicates the perspective diagram of such a droplet and the relative dimensions involved. After curing, a lens 12 is formed with a convex surface. An angle (item II) is formed by the lens between the central core light beam 4 and the divergent beam caused by the lens. Also the beam 4 is caused to converge at an angle of about 5° with the axis of the core of each fiber, up to the focal point.

After the inspection of the formed plano-convex droplets under a microscope, only the identical or very similar droplet-fiber systems are chosen and placed in the oven to be annealed with an appropriate procedure. To decrease the distance of the focal point of the formed lenses, the already lens-affixed fibers may be re-dipped in the said sol-gel solution and essentially the process of lens formation may be repeated. This may be necessary to obtain a desired focal point for the said lenses. Referring to FIGS. 1 and 2 again, a thin layer 2 has a compressibility of 10–45% for pressures of up to 400 pounds per square inch.

What is claimed is:

1. A method of providing a package of an optical waveguide and optical fibers comprising:
    disposing an optical waveguide upon a first rigid substrate;
    providing an arrangement of compressible material layers with optical fibers disposed between the compressible material layers and with the optical fibers disposed within alignment grooves of the substrate, with one of the compressive layers disposed between each fiber and its corresponding groove surface and with an end region of each fiber directed towards the waveguide;
    sandwiching the arrangement between the first and a second rigid substrates; and
    then pressing the substrates towards each other, so as to compress the material layers and force each of the optical fibers in a transverse direction further into its groove to move each fiber into optical alignment with the optical waveguide and retain the optical alignment of each fiber with the optical waveguide.

2. A method according to claim 1 comprising disposing optical fibers between the compressible material layers with end regions of the optical fibers extending beyond the compressible material layers and towards the optical waveguide, whereby said end regions of the optical fibers are free from compression while being held rigidly in fixed positions after pressing of the substrates towards each other.

3. A method according to claim 2 comprising disposing the end regions of the optical fibers in an open space with the open space extending around the end regions of the fibers.

4. A method according to claim 1 comprising locating the assembly of first and second rigid substrates containing the arrangement of compressive material layers and the optical fibers between rigid plates, forcing the plates towards each other to press the substrates towards each other and move the fibers into optical alignment with the optical waveguide, and securing the rigid plates in desired relative positions to retain the optical alignment of the fibers with the waveguide.

5. A method according to claim 4 comprising forcing the rigid plates towards each other at a plurality of localized positions so as to adjust the force applied between and the distance between the rigid plates at each of the localized positions.

6. A method according to claim 5 comprising aligning the first substrate with the second substrate by disposing each substrate partly within a respective alignment recess of a corresponding rigid plate, and with the rigid plates positioned to align the alignment recesses, forcing the rigid plates towards each other.

7. A method according to claim 1, wherein prior to location of each fiber between the compressive material layers, the end region of each fiber is formed at its end with a lens by locating a transparent flowable material on to the end surface; and then causing the flowable material to harden and form the lens with a convex surface.

8. A package of an optical waveguide and a plurality of fibers comprising:
    an optical waveguide held by a first rigid substrate;
    an arrangement of a plurality of optical fibers disposed between compressive material layers and with the fibers disposed within grooves formed within the first rigid substrate with one of the compressive layers disposed between each fiber and the surface of its corresponding groove and with end regions of the fibers directed towards the waveguide; and
    a second substrate, the arrangement of optical fibers and compressive material layers sandwiched between the first and second rigid substrates with the substrates pressed towards each other to result in compression of the compressive material layers and with each optical fiber held inwardly into its groove and in optical alignment with the waveguide.

9. A package according to claim 8, wherein the end regions of the optical fibers extend beyond the compressive material layers and towards the optical waveguide to render the end regions free from compression.

10. A package according to claim 9, wherein the end regions of the optical fibers lie in an open space with the open space extending around the end regions.

11. A package according to claim 8, wherein the first and second rigid substrates and the arrangement of optical fibers and compressive material layers contained therebetween are located between two rigid plates, the rigid plates being secured in desired relative positions and compressing the arrangement to position and retain the optical fibers in optical alignment with the waveguide.

12. A package according to claim 11, wherein the rigid plates are secured together at a plurality of localized positions with the compressive force applied to the arrangement having been individually adjusted at each of the plurality of localized positions.

13. A package according to claim 11, wherein each rigid plate is provided with an alignment recess for a corresponding rigid substrate and the rigid substrates are relatively aligned by the alignment recesses.

14. A package according to claim 8, wherein the end of each end region of each optical fiber carries a lens having a convex surface.

* * * * *